United States Patent
Chen

(10) Patent No.: US 8,836,546 B2
(45) Date of Patent: Sep. 16, 2014

(54) KEYPAD FOR A WIRELESS DEVICE

(75) Inventor: Chao Chen, Waterloo (CA)

(73) Assignee: BlackBerry Limited, Waterloo (CA)

( * ) Notice: Subject to any disclaimer, the term of this patent is extended or adjusted under 35 U.S.C. 154(b) by 1793 days.

(21) Appl. No.: 11/863,877

(22) Filed: Sep. 28, 2007

(65) Prior Publication Data

US 2009/0085777 A1 Apr. 2, 2009

(51) Int. Cl.
- H03K 17/94 (2006.01)
- H03M 11/00 (2006.01)
- H01H 5/14 (2006.01)
- H01H 13/705 (2006.01)
- G06F 3/02 (2006.01)
- H01H 13/83 (2006.01)

(52) U.S. Cl.
CPC .......... *G06F 3/0202* (2013.01); *H01H 2221/07* (2013.01); *H01H 13/705* (2013.01); *H01H 13/83* (2013.01); *H01H 2221/084* (2013.01); *H01H 2221/08* (2013.01); *H01H 2229/00* (2013.01); *H01H 2221/006* (2013.01)
USPC ................... 341/22; 341/20; 341/21; 341/23; 200/408; 200/517

(58) Field of Classification Search
USPC .................... 341/20, 21, 22, 23; 200/408, 517
See application file for complete search history.

(56) References Cited

U.S. PATENT DOCUMENTS

| | | | | |
|---|---|---|---|---|
| 3,797,630 A | * | 3/1974 | Zilkha | 400/479.1 |
| 4,314,117 A | * | 2/1982 | Ditzig | 200/5 A |
| 4,609,791 A | * | 9/1986 | Abbat | 200/5 A |
| 5,456,541 A | * | 10/1995 | Ching-Shui | 400/490 |
| 6,455,795 B1 | * | 9/2002 | Murakami et al. | 200/345 |
| 6,635,838 B1 | * | 10/2003 | Kornelson | 200/341 |
| 6,743,993 B1 | * | 6/2004 | Clark et al. | 200/314 |
| 7,034,238 B2 | * | 4/2006 | Uleski et al. | 200/500 |
| 7,102,093 B1 | * | 9/2006 | Chiu | 200/341 |
| 7,358,454 B2 | | 4/2008 | Senzui | |
| 2001/0011999 A1 | * | 8/2001 | Mochizuki | 345/168 |
| 2002/0027065 A1 | * | 3/2002 | Kenmochi | 200/314 |
| 2005/0167254 A1 | * | 8/2005 | Oosawa | 200/314 |
| 2006/0121243 A1 | * | 6/2006 | Chen et al. | 428/138 |

FOREIGN PATENT DOCUMENTS

| | | |
|---|---|---|
| CN | 1967754 | 5/2007 |
| EP | 1 137 028 A2 | 9/2001 |
| JP | 2003 297181 | 10/2003 |
| JP | 2005 050709 | 2/2005 |
| JP | 2005-050709 | 2/2005 |

OTHER PUBLICATIONS

Chinese Office Action for Corresponding Chinese Patent Application No. 200810165793.7, Issued Aug. 9, 2010.

(Continued)

*Primary Examiner* — Hai Phan
*Assistant Examiner* — Amine Benlagsir
(74) *Attorney, Agent, or Firm* — Hanley, Flight & Zimmerman, LLC

(57) ABSTRACT

A keypad for a wireless device is disclosed. The keypad comprises one or more key stems, each key stem having an upper key stem surface. The keypad also comprises one or more keycaps configured to be mounted over the one or more key stems, each keycap having a lower keycap surface for bonding to the upper key stem surface of each key stem with adhesive. The upper key stem surface includes at least one depression and at least one groove along a perimeter of the upper key stem surface. The depression and groove can help reduce the risk of adhesive flow to undesirable areas.

17 Claims, 4 Drawing Sheets

(56) References Cited

OTHER PUBLICATIONS

English Translation of Chinese Office Action for Corresponding Chinese Patent Application No. 200810165793.7, Issued Aug. 9, 2010.
Australian Governement IP Australia, "Notice of Acceptance," issued in connection with Australian application serial No. 2008216964, issued Jul. 8, 2010, 3 pages.
European Patent Office, Intention to Grant Notice, issued in connection with European application serial No. 07 117 582.2, issued Apr. 29, 2009, 5 pages.
Australian Governement IP Australia, "Examiners First Report," issued in connection with Australian application serial No. 2008216964, issued Nov. 12, 2009, 6 pages.
Canadian Intellectual Property Office, "Examination Report," issued in connection with Canadian application serial No. 2,639,333, issued Mar. 28, 2011, 3 pages.
State Intellectual Property Office of P.R. China, "Certificate of Invention of Patent," issued in connection with Chinese application serial No. 200810165793.7, issued Aug. 31, 2011, 1 page.
State Intellectual Property Office of P.R. China, "Notification of Completion of Formalities for Registration," issued in connection with Chinese application serial No. 200810165793.7, issued May 26, 2011, 2 pages.
State Intellectual Property Office of P.R. China, "Second Office Action," issued in connection with Chinese application serial No. 200810165793.7, issued Jan. 26, 2011, 12 pages.
European Patent Office, "Certificate for a European Patent," issued in connection with European application serial No. 07 117 582.2, issued Nov. 11, 2009, 2 pages.
European Patent Office, "Decision to Grant," issued in connection with European application serial No. 07 117 582.2, issued Oct. 15, 2009, 2 pages.
European Patent Office, "European Search Report," issued in connection with European application serial No. 07 117 582.2, issued Mar. 26, 2008, 6 pages.
Canadian Intellectual Property Office, "Notice of Allowance," issued in connection with Canadian application serial No. 2,639,333, issued Jul. 11, 2012, 1 page.

* cited by examiner

KEYPAD FOR A WIRELESS DEVICE

FIELD OF THE APPLICATION

This application relates to the field of wireless devices, and more specifically, to a keypad for a wireless device.

BACKGROUND

Current wireless mobile communication devices include microprocessors, memory, soundcards, speakers, headphones, and run one or more software applications in addition to providing for voice communications. Examples of software applications used in these wireless devices include micro-browsers, address books, email clients, instant messaging ("IM") clients, and wavetable instruments. Additionally, wireless devices have access to a plurality of services via the Internet. A wireless device may, for example, be used to browse web sites on the Internet, to transmit and receive graphics, and to execute streaming audio and/or video applications. Such wireless devices may operate on a cellular network, on a wireless local area network ("WLAN"), or on both of these types of networks.

One problem with current wireless devices pertains to the performance of the device's keypad. In particular, the keys of the keypad are often stiff, making them difficult for a user to depress to initiate an input or selection. The keypad of a wireless device typically includes the following components: keycaps, clear (or translucent or white in colour) silicon rubber key stems coupled by a clear (or translucent or white in colour) silicon rubber web, clear plastic light guides, an opaque (e.g., black) polycarbonate ("PC") film for light shielding (e.g., located on top of the web), and opaque (e.g., black) plastic elements for light shielding (e.g., located to the sides of the light guides). These components are typically united or bonded together by an adhesive such as glue. In a typical implementation, the keycaps are glued to the key stems, the glue being applied between the flat lower surface of each keycap and the flat upper surface of each key stem. However, excess glue may flow away from the keycap and key stem and contact the PC film. If the glue comes into contact with the PC film, it may cause the PC film to become bonded to the web (that is coupled to the key stems). This may cause the web to stiffen or strengthen. This stiffening of the web is problematic as it can cause stiffening of the keys of the keypad. In fact, it has been estimated that more than 95% of stiff key problems in keypads of wireless devices are caused by excess adhesive flowing from between the keycaps and key stems.

A need therefore exists for an improved keypad for a wireless device. Accordingly, a solution that addresses, at least in part, the above and other shortcomings is desired.

BRIEF DESCRIPTION OF THE DRAWINGS

Features and advantages of the embodiments of the present application will become apparent from the following detailed description, taken in combination with the appended drawings, in which.

It will be noted that throughout the appended drawings, like features are identified by like reference numerals.

DETAILED DESCRIPTION OF THE EMBODIMENTS

In the following description, details are set forth to provide an understanding of the application. In some instances, certain software, circuits, structures and techniques have not been described or shown in detail in order not to obscure the application.

Figure 1:
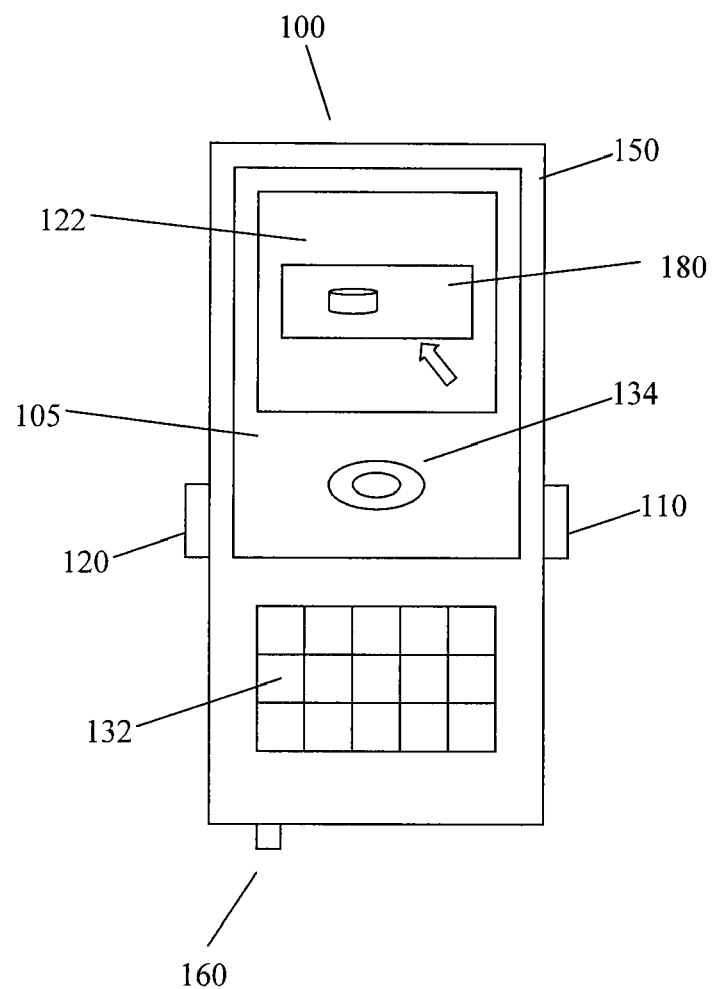
FIG. 1 is a front view illustrating an example of a wireless device in accordance with an embodiment of the application.

FIG. 1 is a front view illustrating an example of a wireless device 100 in accordance with an embodiment of the application. The wireless device 100 includes a case 150, a liquid crystal display ("LCD") 122, a graphical user interface ("GUI") 180 displayed on the LCD 122, a lens 105 mounted over the LCD 122 for protection thereof, a speaker 134, a keypad (or keyboard) 132, a thumbwheel (or trackwheel) 110, various select buttons 120, and various inputs/outputs (e.g., power connector jack, data interface ports, headphones jack, etc.) 160. Internally, the wireless device 100 typically includes one or more circuit boards (not shown in FIG. 1), a CPU or microprocessor 138, memory 124, 126, 200, a battery 156, an antenna (not shown), etc., which are operatively coupled to the various inputs/outputs 160, the keypad 132, the display screen 122, the speaker 134, etc., as will be described below.

Figure 2:
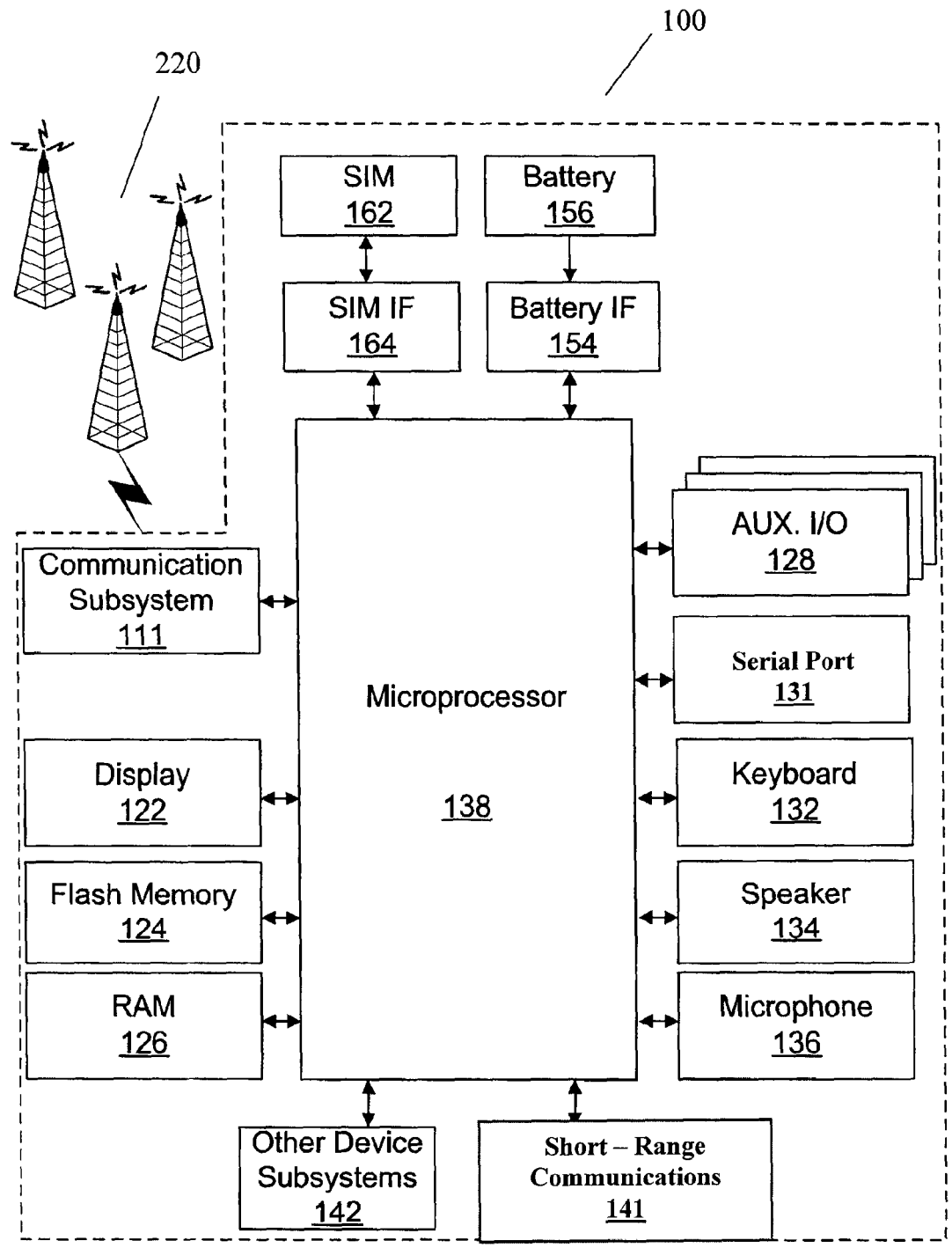
FIG. 2 is a block diagram illustrating the wireless device of FIG. 1.

FIG. 2 is a block diagram illustrating the wireless device 100 of FIG. 1. The wireless device 100 may operate over a wireless network 220. The wireless network 220 may include antenna, base stations, access points, transceivers, supporting radio equipment, etc., as known to those of ordinary skill in the art, for supporting wireless communications between the wireless device 100 and other devices (not shown). The wireless network 220 may be coupled to a wireless network gateway (not shown) and to a local area network (not shown) to which the other devices (e.g., data processing systems, computers, etc.) may be coupled.

The wireless device 100 may be a two-way communication device having at least voice and advanced data communication capabilities, including the capability to communicate with other devices. Depending on the functionality provided by the device 100, it may be referred to as a data messaging device, a two-way pager, a cellular telephone with data messaging capabilities, a wireless Internet appliance, a data communication device (with or without telephony capabilities), a Wi-Fi device, a WLAN device, a dual-mode (i.e., Wi-Fi and cellular) device, or a portable audio device. The device 100 may communicate with any one of a plurality of transceiver stations (not shown) within its geographic coverage area.

The wireless device 100 has a communication subsystem 111, which includes a RF receiver, a RF transmitter, and associated components, such as one or more antenna elements (e.g., embedded or internal), local oscillators ("LOs"), and a processing module such as a digital signal processor ("DSP") (all not shown). As will be apparent to those skilled in the field of communications, the particular design of the communication subsystem 111 depends on the communication network 220 in which the device 100 is intended to operate.

The device 100 may be capable of cellular network access and hence the device 100 may have a subscriber identity module (or "SIM" card) 162 for inserting into a SIM interface ("IF") 164 in order to operate on the cellular network (e.g., a global system for mobile communication ("GSM") network).

The device 100 may be a battery-powered device and so it may also include a battery IF 154 for receiving one or more rechargeable batteries 156. The battery (or batteries) 156 provides electrical power to most if not all electrical circuitry in the device 100, and the battery IF 154 provides for a mechanical and electrical connection for it. The battery IF 154 is coupled to a regulator (not shown) which provides regulated power to the circuitry of the device 100.

The wireless device 100 includes a microprocessor 138 which controls overall operation of the device 100. Communication functions, including at least data and voice communications, are performed through the communication subsystem 111. The microprocessor 138 also interacts with additional device subsystems such as the display 122, a flash memory 124 or other persistent store, a random access memory ("RAM") 126, auxiliary input/output ("I/O") subsystems 128, a serial port (e.g., a universal serial bus ("USB") port) 131, the keypad 132, the clickable thumbwheel 110, the speaker 134, a microphone 136, a short-range communications subsystem 141, and other device subsystems 142. Some of the subsystems shown in FIG. 2 perform communication-related functions, whereas other subsystems may provide "resident" or on-device functions. Some subsystems, such as the keypad 132 and display 122, for example, may be used for both communication-related functions, such as entering a text message for transmission over a communication network, and device-resident functions such as a calculator or task list. Operating system software modules (i.e., 202 in FIG. 3) used by the microprocessor 138 may be stored in a persistent store such as the flash memory 124, which may alternatively be a read-only memory ("ROM") or similar storage element (not shown). Those skilled in the art will appreciate that the operating system, specific device applications, or parts thereof, may be temporarily loaded into a volatile store such as RAM 126.

The microprocessor 138, in addition to its operating system functions, preferably enables execution of software applications on the device 100. A predetermined set of applications which control basic device operations, including at least data and voice communication applications, will normally be installed on the device 100 during its manufacture. A preferred application that may be loaded onto the device 100 may be a personal information manager ("PIM") application having the ability to organize and manage data items relating to the user such as, but not limited to, instant messaging ("IM"), email, calendar events, voice mails, appointments, and task items. Naturally, one or more memory stores are available on the device 100 and SIM 162 to facilitate storage of PIM data items and other information.

The PIM application preferably has the ability to send and receive data items via the wireless network 220. In a preferred embodiment, PIM data items are seamlessly integrated, synchronized, and updated via the wireless network 220, with the wireless device user's corresponding data items stored and/or associated with a host computer system (not shown) thereby creating a mirrored host computer on the device 100 with respect to such items. This is especially advantageous where the host computer system is the wireless device user's office or home computer system. Additional applications may also be loaded onto the device 100 through the network 220, the auxiliary I/O subsystem 128, the serial port 131, the short-range communications subsystem 141, or other device subsystems 142, and installed by a user in RAM 126 or non-volatile flash memory 124 for execution by the microprocessor 138. Such flexibility in application installation increases the functionality of the device 100 and may provide enhanced on-device functions, communication-related functions, or both. For example, secure communication applications may enable electronic commerce functions and other such financial transactions to be performed using the wireless device 100.

In a data communication mode, a received signal such as a text message, an email message, or web page download will be processed by the communication subsystem 111 and input to the microprocessor 138. The microprocessor 138 will preferably further process the signal for output to the display 122 and/or to the auxiliary I/O device 128. A user of the wireless device 100 may also compose data items, such as email messages, for example, using the keypad 132 in conjunction with the display 122, and possibly the auxiliary I/O device 128. The keypad 132 may be, but need not be, a complete alphanumeric keyboard and/or a telephone-type keypad. These composed items may be transmitted over a communication network 220 through the communication subsystem 111 or the short range communication subsystem 141.

For voice communications, the overall operation of the wireless device 100 is substantially similar, except that the received signals would be output to the speaker 134 and signals for transmission would be generated by the microphone 136. Alternative voice or audio I/O subsystems, such as a voice message recording subsystem, may also be implemented on the device 100. Although voice or audio signal output is preferably accomplished primarily through the speaker 134, the display 122 may also be used to provide, for example, an indication of the identity of a calling party, duration of a voice call, or other voice call related information.

The serial port 131 shown in FIG. 2 is normally implemented in a personal digital assistant ("PDA") type communication device for which synchronization with a user's desktop computer is a desirable, albeit optional, component. The serial port 131 enables a user to set preferences through an external device or software application and extends the capabilities of the device 100 by providing for information or software downloads to the device 100 other than through a wireless communication network 220. The alternate download path may, for example, be used to load an encryption key onto the device 100 through a direct and thus reliable and trusted connection to thereby provide secure device communication.

The short-range communications subsystem 141 shown in FIG. 2 is an additional optional component which provides for communication between the device 100 and different systems or devices, which need not necessarily be similar devices. For example, the short-range communications subsystem 141 may include an infrared device and associated circuits and components, or a Bluetooth™ communication module, to provide for communication with similarly-enabled systems and devices. (Bluetooth™ is a registered trademark of Bluetooth SIG, Inc.)

Figure 3:
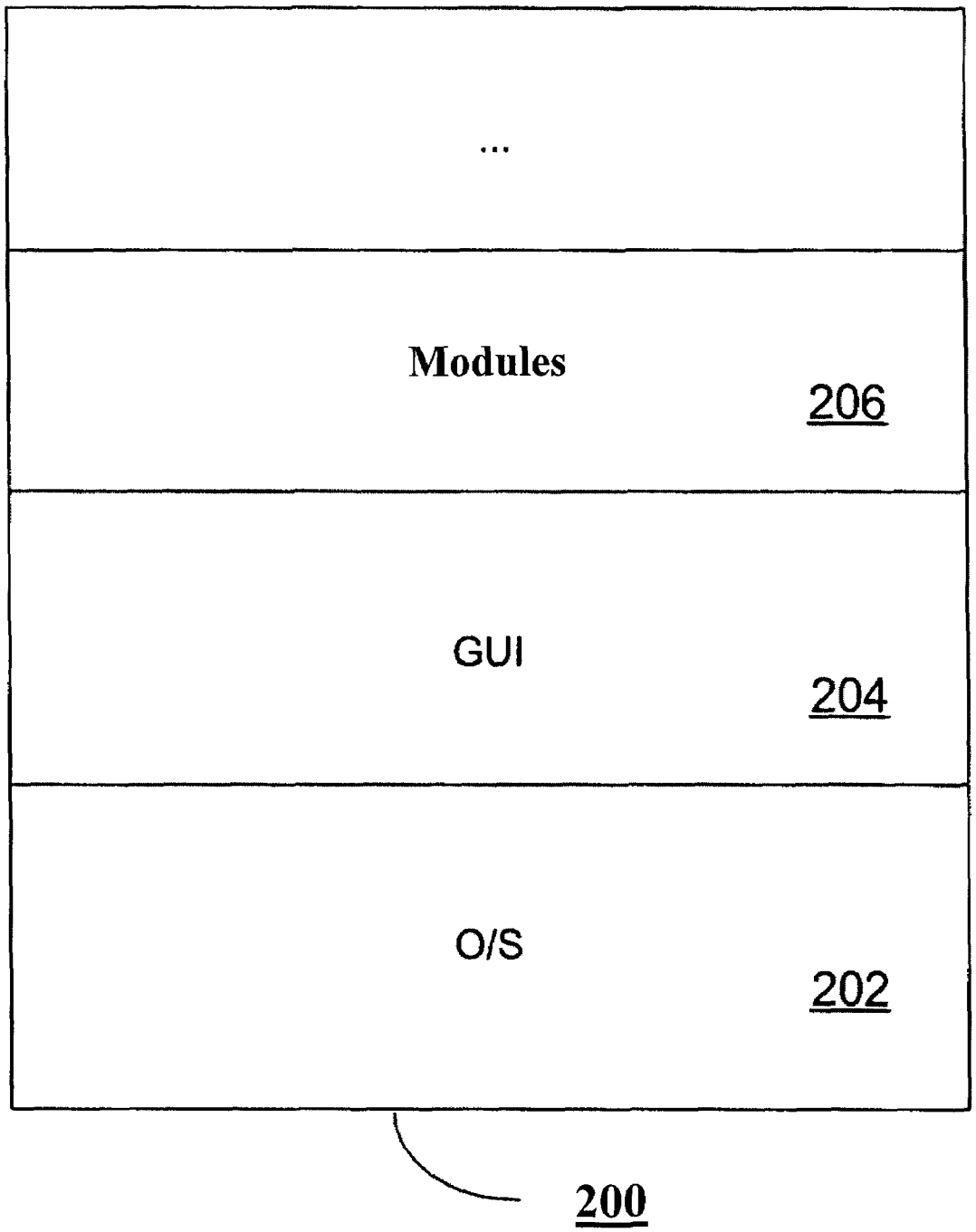
FIG. 3 is a block diagram illustrating a memory of the wireless device of FIG. 1.

FIG. 3 is a block diagram illustrating a memory 200 of the wireless device 100 of FIG. 1. The microprocessor 138 is coupled to the memory 200. The memory 200 has various hardware and software components for storing information (e.g., instructions, data, database tables, test parameters, etc.) for enabling operation of the device 100 and may include flash memory 124, RAM 126, ROM (not shown), disk drives (not shown), etc. In general, the memory 200 may include a variety of storage devices typically arranged in a hierarchy of storage as understood by those skilled in the art.

According to one embodiment, the wireless device 100 may be a multi-tasking wireless communications device configured for sending and receiving data items and for making and receiving voice calls. In addition, the microprocessor 138 of the wireless device 100 is typically coupled to one or more devices or subsystems (e.g., 110, 120, 132) for receiving user commands or queries and for displaying the results of these commands or queries to the user on the display 122. To provide a user-friendly environment to control the operation of the device 100, operating system ("O/S") software modules 202 resident on the device 100 provide a basic set of operations for supporting various applications typically operable through the GUI 180 and supporting GUI software modules 204. For example, the O/S 202 provides basic input/output system features to obtain input from the auxiliary I/O 128, the keypad 132, the clickable thumbwheel 110, and the like, and for facilitating output to the user through the display 122, the speaker 134, etc. Though not shown, one or more applications for managing communications or for providing personal digital assistant like functions may also be included. According to one embodiment, the wireless device 100 is provided with hardware and/or software modules 206 for facilitating and implementing various additional functions.

A user may interact with the wireless device 100 and its various software modules 202, 204, 206, using the GUI 180. GUIs are supported by common operating systems and provide a display format which enables a user to choose commands, execute application programs, manage computer files, and perform other functions by selecting pictorial representations known as icons, or items from a menu through use of an input or pointing device such as a thumbwheel 110 and keypad 132. In general, a GUI is used to convey information to and receive commands from users and generally includes a variety of GUI objects or controls, including icons, toolbars, drop-down menus, pop-up menus, text, dialog boxes, buttons, and the like.

A user typically interacts with a GUI 180 presented on a display 122 by using an input or pointing device (e.g., a thumbwheel 110, a keypad 132, etc.) to position a pointer or cursor over an object (i.e., "pointing" at the object) and by "clicking" on the object such as by depressing the thumbwheel 110 or by depressing a button on the keypad 132. This is often referred to as a point-and-click operation or a selection operation. Typically, the object may be hi-lighted (e.g., shaded) when it is pointed at. As will be discussed in more detail below, stiffening of the keys of the keypad 132 can make the keys difficult for a user to depress to initiate an input or selection, thereby affecting the user's interaction with GUI 180.

Typically, a GUI based system presents application, system status, and other information to the user in "windows" appearing on the display 122. A window is a more or less rectangular area within the display 122 in which a user may view an application or a document. Such a window may be open, closed, displayed full screen, reduced to an icon, increased or reduced in size, or moved to different areas of the display 122. Multiple windows may be displayed simultaneously, such as: windows included within other windows, windows overlapping other windows, or windows tiled within the display area.

Figure 4:
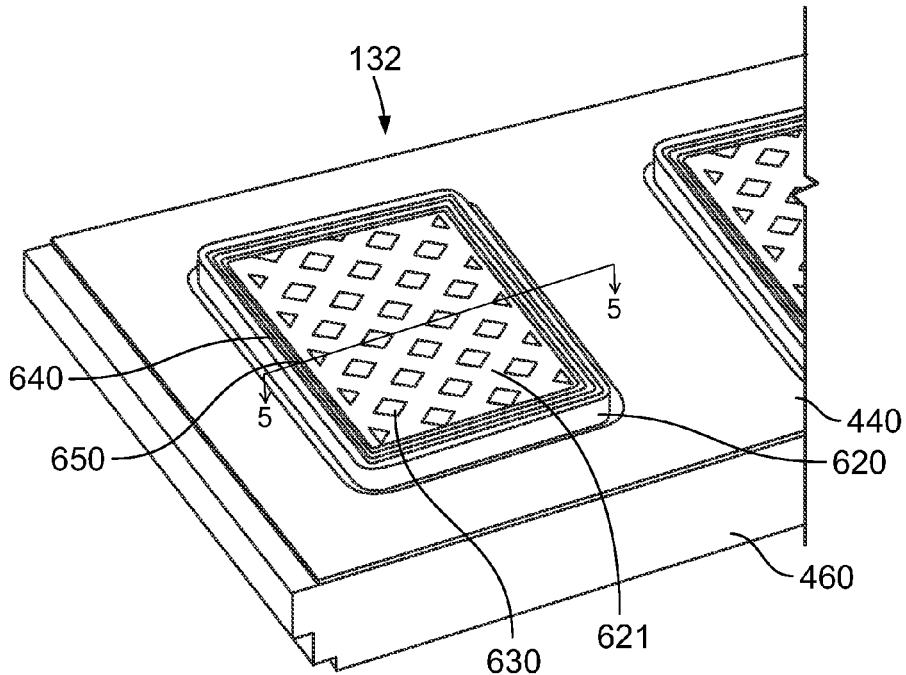
FIG. 4 is a partial perspective view illustrating a keypad for a wireless device in accordance with an embodiment of the application; and, FIG. 5 is a partial perspective cross section view of the example keypad of FIG. 4 taken along line 5-5 of FIG. 4.
Figure 5:
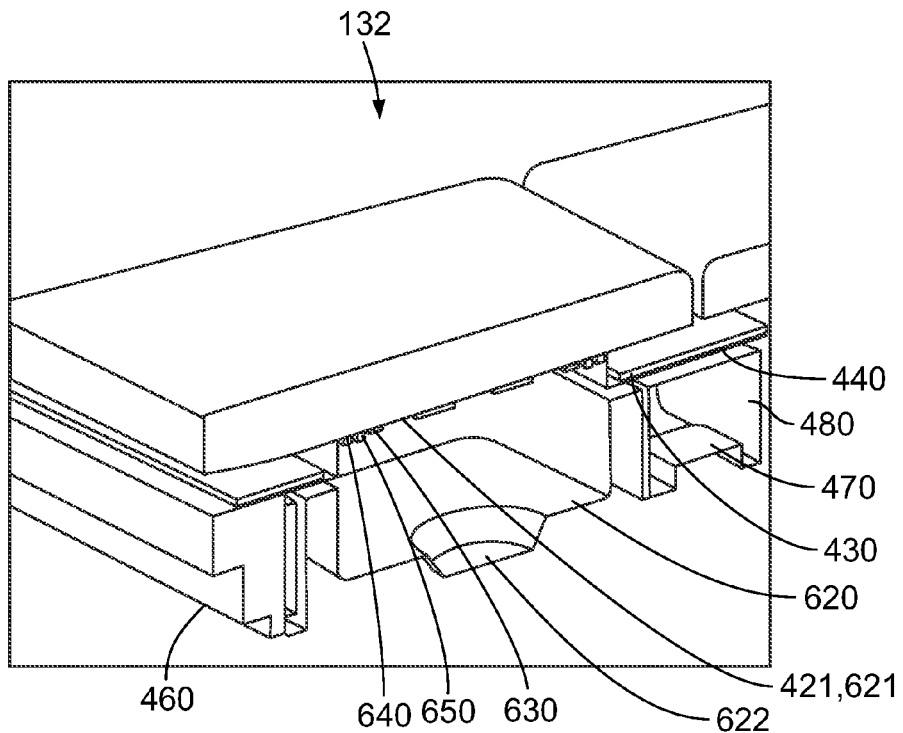

FIG. 4 is a partial perspective view illustrating a keypad 132 for a wireless device 100 in accordance with an embodiment of the application. FIG. 5 is a partial perspective cross section view illustrating the keypad 132 of FIG. 4 in accordance with an embodiment of the application. The keypad 132 of a wireless device 100 typically includes the following components: keycaps 410, clear (or translucent or white in colour) silicon rubber key stems 620 coupled by a clear (or translucent or white in colour) silicon rubber web 430, clear plastic light guides 480, a substantially opaque (e.g., black) polycarbonate ("PC") film 440 for light shielding proximate to the web 430 (e.g., located on top of the web 430), and opaque (e.g., black) plastic elements (e.g., frame, shield, etc.) 460 for light shielding (e.g., located to the sides of the light guides 480). Some of these components may be united or bonded together by an adhesive. The adhesive may be any form of glue, paste, resin, cement or any other substance that can bind one element to another. Many types of adhesive can exist in a liquid or semi-liquid state and, when in that state, can flow. Some types of adhesive can also assume a substantially solid form in which the adhesive does not substantially flow. Examples of adhesives that may be used in the implementations described below include instant glue and ultraviolet light-cured glue.

In a typical implementation, the keycaps 410 are shaped or otherwise configured to be placed in proximity to and mounted over key stems 620, and to be bonded to key stems 620. Each lower keycap surface 411 may be bonded to a respective upper surface 621 of a key stem 620 with an adhesive such as glue, the glue being applied in a liquid or semi-liquid state between the lower surface 411 of each keycap 410 and the upper surface 621 of each key stem 620. As it becomes more solid, the glue bonds a lower keycap surface 411 to a respective upper surface 621 of a key stem 620. Because the glue is delivered in a state in which it can flow, excess glue may flow away from the keycap 410 and key stem 620 and contact the surrounding PC film 440. If the glue comes into contact with the PC film 440, it may cause the PC film 440 to become bonded to the web 430 (that is coupled to the key stems 620). This may cause the web 430 to stiffen or strengthen. This stiffening of the web 430 is problematic as it can cause stiffening of the keys of the keypad 132.

The present application provides a keypad 132 that includes features that reduce adhesive overflow onto the web 430 and hence reduce the occurrence of stiff keypad keys.

As depicted in FIG. 4, an upper surface 621 of key stem 620 is bonded to lower surface 411 of keycap 410. As depicted in FIG. 5, the upper surface 621 of each key stem 620 has features that reduce adhesive overflow. In the exemplary embodiment depicted in FIG. 5, shallow (e.g., approximately 0.05 mm deep) depressions 630 are included in the upper surface 621 of each key stem 620. The depressions 630, which are depicted in FIG. 5 as square, but which can be any shape, act to slow down the flow of adhesive (i.e., make it more difficult for the adhesive to move). The depressions 630 thereby reduce adhesive overflow, including overflow that may result in the event that excess adhesive is applied.

FIG. 5 also depicts two grooves (e.g., approximately 0.15 mm deep) 640, 650 that are included in the upper surface 621 of each key stem 620 along the edges (i.e., the perimeter) of the key stem 620. The grooves 640, 650 guide the flow of any adhesive that is applied to the upper surface 621. In the event that excess adhesive is applied, the excess adhesive flows along the grooves 640, 650 rather than flowing to or over the edge of the upper key stem surface 621 where it may contact the PC film 440 or any other component where adhesive does not belong. Adhesive may also tend to enter the grooves 640, 650 rather than flow to undesirable areas, thereby reducing the chance that adhesive will come into contact with the PC film 440 or any other component where adhesive does not belong.

As depicted in FIG. 5, the grooves 640, 650 are substantially outside the depressions 630. In other words, the grooves 640, 650 are disposed between the edge of the upper key stem surface 621 and the depressions 630, and the depressions 630 are generally not disposed between the edge of the upper key stem surface 621 and any of the grooves 640, 650. In the example implementation of FIG. 5, the grooves 640, 650 completely surround or enclose the depressions 630, although this application includes embodiments in which a groove does not form a closed curve, and thus a depression is substantially enclosed by a groove, although not completely enclosed.

According to one embodiment, the lower surface 622 of each key stem 620 is used to contact a signal generator (not shown) for transmitting a signal to the microprocessor 138 for indicating that the corresponding key has been pressed by a user. According to one embodiment, the signal generator includes a dome membrane (not shown). The dome membrane may be, for example, a poly dome membrane or a metal dome membrane.

According to one embodiment, the web 430 is flexible allowing for travel of a key stem 620 when the keycap 410 bonded to the key stem 620 is pressed by a user (i.e., when pressure is applied to the upper key stem surface 621). According to another embodiment, the key stems 620 and the web 430 are formed in one piece, and are made from the same materials, such as silicon (or silicone) rubber.

According to one embodiment, the keypad 132 includes a backlight (e.g., a light emitting diode ("LED")) (not shown) mounted in a pocket 470 formed in a light guide 480 located below the PC film 440 and adjacent to the key stem 620 for emitting light through the upper key stem surface 621 and keycap 410. In this embodiment, the PC film 440 prevents light from being transmitted through the web 430 and/or other components between key stems 620. In one embodiment, the light guides 480 and the opaque shielding elements 460 can be bonded together with adhesive, although this adhesive is not necessarily the same as the adhesive that bonds an upper key stem surface 621 to a keycap 410.

According to another embodiment, rather than the clear light guides 480 and the opaque shielding elements 460 being bonded together with adhesive as described above, the shielding elements 460 may be formed over the light guides 480 in a double shot injection molding process. In particular, a first shot injection molding step may be used to form the clear light guides 480. This may be followed by a second shot injection molding step which molds the opaque shielding elements 460 over the clear light guides 480.

According to one embodiment, the depressions 630 added to the upper surface 621 of each key stem 620 may be one or more of a number of shapes (e.g., square, rectangular, triangular, round, polygonal, etc.). The depressions 630 need not be uniform in size or in shape, although the depressions 630 may be uniform in size, uniform in shape, or both. Although FIG. 5 depicts a grid made from a plurality of square depressions 630, according to one embodiment, the depressions 630 may be arranged in one or more of a number of patterns (e.g., in rows, in arcs, in circles, randomly, etc.). Further, FIG. 5 depicts the grid of square depressions 630 at an angle with respect to the perimeter of the upper key stem surface 621, but the application encompasses embodiments in which a grid of depressions aligns with the perimeter. Moreover, although embodiments have been described having a plurality of depressions 630, the application encompasses embodiments having a single depression as well.

According to one embodiment, the grooves 640, 650 present substantially straight lines that are substantially a uniform distance from the edge along the perimeter of the upper surface 621. Additional embodiments may include more or fewer than two grooves, and the grooves need not include straight lines or be any uniform distance from the edge of the upper surface 621. The grooves 640, 650 may be, but need not be, parallel to one another. One groove may completely or substantially enclose another, as depicted in FIG. 5, but the application includes embodiments in which the grooves cross one another. Further, an individual groove need not form a closed loop, and grooves along the perimeter of the upper surface 621 may comprise one or more unconnected segments.

The application may provide one or more advantages. First, the depressions 630 added to each upper key stem surface 621 reduce the flow rate of adhesive which reduces overflow of excess adhesive onto the PC film 440, hence reducing the occurrence of stiff keypad keys. Second, the grooves 640, 650 absorb excess adhesive, hence further reducing overflow of excess adhesive onto the PC film 440 and hence further reducing the occurrence of stiff keypad keys. Third, the presence of depressions 630 or grooves 640, 650 does not substantially interfere with bonding an upper surface 621 of the key stem 620 to a lower surface 411 of the keycap 410.

The embodiments of the application described above are intended to be exemplary only. Those skilled in this art will understand that various modifications of detail may be made to these embodiments, all of which come within the scope of the application.

What is claimed is:

1. A keypad for a wireless device, comprising:
a key stem having an upper key stem surface, the upper key stem surface having a depression and a first groove, the first groove positioned between an outer perimeter edge of the upper key stem surface and the depression such that a first edge of the first groove is spaced away from the outer perimeter edge of the upper key stem surface and a second edge of the first groove is spaced away from the first edge, the second edge positioned between the first edge and the depression, the key stem having a second groove along the perimeter of the upper key stem surface, the second groove substantially enclosing the first groove;
a keycap configured to be mounted over the key stem, the keycap having a lower keycap surface configured to be bonded to the upper key stem surface of the key stem with an adhesive; and
a web coupled to the key stem, the web to allow the key stem to independently travel when pressure is applied to the upper key stem surface, wherein the key stem and the web are formed in one piece.

2. The keypad of claim 1, and further comprising a substantially opaque film proximate to the web.

3. The keypad of claim 2, wherein the film is a polycarbonate film.

4. The keypad of claim 1, wherein the depression is a square depression.

5. The keypad of claim 4, wherein the square depression is a grid of square depressions.

6. The keypad of claim 5, wherein the grid of square depressions is at an angle with respect to the perimeter of the upper key stem surface.

7. The keypad of claim 1, wherein the groove completely encloses the depression.

8. The keypad of claim 1, wherein the key stem and the web are made from silicon rubber.

9. The keypad of claim 8, wherein the silicon rubber key stem and the silicon rubber web are translucent.

10. The keypad of claim 1, wherein the adhesive is one of instant glue and ultraviolet light-cured glue.

11. The keypad of claim 1, wherein the depression is approximately 0.05 millimeters deep.

12. The keypad of claim 1, wherein the groove is approximately 0.15 millimeters deep.

13. A keypad comprising:
a key stem having an upper key stem surface to receive a keycap, the upper key stem surface defined by a plurality of outer perimeter edges, the upper key stem surface having a plurality of depressions formed between a first outer perimeter edge of the upper key stem surface and a second outer perimeter edge of the upper key stem surface and at least a first groove and a second groove formed between the first outer perimeter edge and the plurality of depressions, the first groove having a first edge positioned away from the first outer perimeter edge and a second edge spaced away from the first edge and positioned between the first edge and the plurality of depressions, the upper key stem surface having the second groove adjacent the first outer perimeter edge of the upper key stem surface, the second groove substantially enclosing the first groove, the plurality of depressions to reduce a flow rate of excess fluid flowing between the keycap and the surface of the key stem and the first and second grooves to absorb the excess fluid when the keycap is coupled to the surface of the key stem via the fluid; and
a web coupled to the key stem, the web to allow the key stem to independently travel when pressure is applied to the upper key stem surface, wherein the key stem and the web are formed in one piece.

14. The keypad of claim 13, wherein the plurality of grooves substantially surround the plurality of depressions.

15. The keypad of claim 13, wherein the plurality of depressions is at an angle with respect to the first and second outer perimeter edges of the surface.

16. The keypad of claim 13, wherein the first outer perimeter edge is substantially flush relative to a surface adjacent the plurality of grooves.

17. A keypad comprising:
a key stem having an upper key stem surface that includes a depression and a first groove and a second groove, the first and second grooves formed adjacent an outer perimeter edge of the upper key stem surface, an edge of the first groove is spaced away from the outer perimeter edge defining the upper key stem surface and the second groove, the first groove positioned between the depression and the outer perimeter edge to define a channel between the outer perimeter edge and the depression, wherein the first groove substantially surrounds the depression and wherein the outer perimeter edge is substantially aligned with a portion of the upper key stem surface adjacent the depression, the second groove substantially enclosing the first groove;
a keycap and a film member, the keycap to be bonded to the upper key stem surface of the key stem via adhesive and the film member to be positioned underneath the upper key stem surface, wherein the depression is to reduce a flow rate of excess adhesive flowing between the keycap and the upper key stem surface and the channel is to absorb the excess adhesive when a keycap is mounted to the upper key stem surface to prevent the adhesive from flowing onto the film member; and
a web coupled to the key stem, the web to allow the key stem to independently travel when pressure is applied to the upper key stem surface, wherein the key stem and the web are formed in one piece.

\* \* \* \* \*